(12) United States Patent
Mori

(10) Patent No.: US 6,248,834 B1
(45) Date of Patent: Jun. 19, 2001

(54) THERMOPLASTIC ELASTOMER COMPOSITION

(75) Inventor: Hiroyuki Mori, Nagoya (JP)

(73) Assignee: Mitsubishi Chemical MKV Company, Tokyo (JP)

( * ) Notice: Subject to any disclaimer, the term of this patent is extended or adjusted under 35 U.S.C. 154(b) by 0 days.

(21) Appl. No.: 09/357,954

(22) Filed: Jul. 21, 1999

(30) Foreign Application Priority Data

Jul. 22, 1998 (JP) .................................................. 10-206131

(51) Int. Cl.$^7$ ...................................................... C08L 27/04
(52) U.S. Cl. ............................ 525/214; 524/519; 524/527
(58) Field of Search .................................... 524/519, 527; 525/214

(56) References Cited

U.S. PATENT DOCUMENTS 5,446,064 * 8/1995 Hori et al. ............................ 525/214
5,914,195 * 6/1999 Hori et al. ............................ 524/536

FOREIGN PATENT DOCUMENTS

0618260 * 10/1994 (EP) .

* cited by examiner

Primary Examiner—Tae H. Yoon
(74) Attorney, Agent, or Firm—Oblon, Spivak, McClelland, Maier & Neustadt, P.C.

(57) ABSTRACT

A thermoplastic elastomer composition comprising 100 by weight of a chlorinated polyethylene, from 5 to 1,000 parts by weight of a crystalline polyolefin resin and from 20 to 1,500 parts by weight of a rubber component, wherein the rubber component is a hydrogenated styrene type rubber or an olefinic rubber which has a Mooney viscosity [$ML_{1+4}$ (100° C.)] within a range of from 50 to 350.

12 Claims, 1 Drawing Sheet

F I G. 1
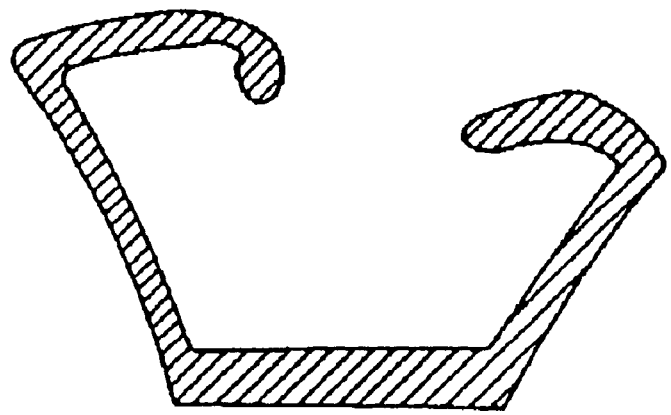

THERMOPLASTIC ELASTOMER COMPOSITION

BACKGROUND OF THE INVENTION

1. Field of the Invention

The present invention relates to a thermoplastic elastomer which is excellent in profile extrudability, oil resistance, bonding properties and weather resistance and which is compatible with an olefinic material.

2. Discussion of Background

A thermoplastic elastomer is excellent in rubber elasticity, coloring properties and design latitude and can be formed by various forming methods such as injection molding, extrusion, blow molding, sheet forming and vacuum forming, like usual thermoplastic materials. Accordingly, it is used in various fields, e.g. as packing materials for automobiles and building materials, interior materials for automobiles, parts for building materials and sundry goods, and its use is rapidly expanding. Especially, an olefinic thermoplastic elastomer is light in weight, can easily be recycled and has a high cost performance, and thus, it has been used frequently in recent years. However, the olefinic thermoplastic elastomer has had a problem that during the extrusion, drawing is difficult as the melt tension is low, and it is particularly difficult to form a complicated shape by profile extrusion, whereby it has been difficult to obtain an extruded product excellent in the surface smoothness. The extruded product has had a problem that as the surface tension is low, the bonding property is poor, and even if the extruded product is bonded by means of a pressure sensitive adhesive double coated tape, it may easily be peeled. Further, the olefinic thermoplastic elastomer tends to swell against an oil such as a lubricating oil, a mineral oil, an engine oil or an animal or plant oil, and thus it has had a problem that it can not be used at a site where an oil may be applied. In such an application where oil resistance is required, a polyvinyl chloride type thermoplastic elastomer is used, but such an elastomer has had a problem that it is not compatible with an olefinic material. Under these circumstances, it has been desired to develop a material which is excellent in profile extrudability, oil resistance, bonding properties and weather resistance and which is compatible with an olefinic material.

SUMMARY OF THE INVENTION

It is an object of the present invention to provide a thermoplastic elastomer composition which is excellent in profile extrudability, oil resistance, bonding properties and weather resistance and has compatibility with an olefinic material and which is capable of being recycled.

To accomplish the above object, the present invention provides a thermoplastic elastomer composition comprising 100 parts by weight of a chlorinated polyethylene, from 5 to 1,000 parts by weight of a crystalline polyolefin resin and from 20 to 1,500 parts by weight of a rubber component, wherein the rubber component is a hydrogenated styrene type rubber or an olefinic rubber which has a Mooney viscosity [$ML_{1+4}(100°\,C.)$] within a range of from 50 to 350.

BRIEF DESCRIPTION OF THE DRAWING

FIG. 1 illustrates an extruding shape of an extruder die.

DETAILED DESCRIPTION OF THE PREFERRED EMBODIMENTS

Now, the present invention will be described in detail.

The chlorinated polyethylene as a component constituting the thermoplastic elastomer composition of the present invention may be one obtained by post-chlorinating an ethylene homopolymer such as high density polyethylene (HDPE), linear low density polyethylene (LLDPE) or branched polyethylene (LDPE) or a copolymer of ethylene with a monomer copolymerizable therewith. The weight average molecular weight of such a polyethylene is usually from 100,000 to 750,000, preferably from 150,000 to 600,000. If the weight average molecular weight of the polyethylene is small, the mechanical properties such as the tensile strength of the thermoplastic elastomer composition tend to be poor, or the absorbability of a plasticizer as described hereinafter, tends to be poor, whereby bleeding out is likely to occur. If the weight average molecular weight is too large, the melt viscosity of the thermoplastic elastomer composition will be high, whereby homogeneous mixing tends to be difficult, and the appearance of a molded product obtainable from such a thermoplastic elastomer composition tends to be poor.

The chlorination degree (the chlorine content) of the chlorinated polyethylene is usually from 20 to 45 wt %, preferably from 25 to 40 wt %. If the chlorination degree of the chlorinated polyethylene is less than 20 wt %, the compatibility with the after-mentioned plasticizer tends to be poor, whereby the plasticizer is likely to bleed out. On the other hand, if it exceeds 45 wt %, the rubber elasticity tends to decrease.

The chlorinated polyethylene is preferably crystalline type, and as an index for the crystallinity, the heat of crystal fusion by a DSC method showing the crystal residue of polyethylene, is preferably from 5 to 35 cal/g, more preferably from 5 to 25 cal/g.

The heat of crystal fusion as measured by a DSC (differential scanning calorimetry) method is a value calculated from the total area of crystal peaks of the DSC chart as measured at a temperature raising rate of 10° C./min by a differential scanning calorimeter, and the crystal melting point by a DSC method which will be described hereinafter, is a temperature of the maximum peak among all crystal peaks obtained at the time of measuring the heat of crystal fusion by a DSC method. The crystal melting point of the crystalline chlorinated polyethylene to be used in the present invention is usually within a range of from 110 to 140° C.

Further, the chlorinated polyethylene is preferably one having an oil absorption of di-2-ethylhexyl phthalate (DOP) of at least 25. For the determination of the DOP oil absorption, DOP is gradually added to 100 ml of the chlorinated polyethylene powder at a temperature of 23° C. under stirring, and the DOP absorption is represented by the volume (ml) of added DOP when the chlorinated polyethylene powder has agglomerated. The DOP oil absorption being at least 25 means that even when 25 ml of DOP is added, the chlorinated polyethylene powder still remains to be in a powder form without forming agglomerates, or any conglomerates formed may readily be disintegrated by a slight force or impact. Its measurement is conducted in accordance with JIS K5101.

The crystalline polyolefin resin which constitutes the thermoplastic elastomer composition, may, for example, be a homopolymer or a copolymer of an α-olefin having from 2 to 20 carbon atoms. Specifically, an ethylene homopolymer, a copolymer of ethylene with an α-olefin or a vinyl monomer such as vinyl acetate or ethylene acrylate, a propylene homopolymer, a block copolymer of propylene with an α-olefin, a random copolymer of propylene with an α-olefin, a 1-butene homopolymer, a random copolymer of 1-butene with an α-olefin, a 4-methyl-1-pentene homopolymer or a random copolymer of 4-methyl-1-pentene with an α-olefin, may be mentioned. These resins may be used alone or in combination as a mixture. As a comonomer, at least one α-olefin such as ethylene, 1-butene, 4-methyl-1-pentene, 1-hexene or 1-octene, may be employed.

Among these crystalline polyolefin resins, crystalline polypropylene resins such as a propylene homopolymer, a block copolymer of propylene with an α-olefin, and a random copolymer of propylene with an α-olefin, are preferred.

The melt flow rate (MFR, conditions: 230° C., 2.16 kg load) of the crystalline polyolefin resin is usually within a range of from 0.01 to 100 g/10 minutes, preferably from 0.1 to 70 g/10 minutes.

The olefinic rubber having a Mooney viscosity [$ML_{1+4}$ (100° C.)] within a range of from 50 to 350, may, for example, be a rubber made of a random copolymer of an α-olefin having from 2 to 20 carbon atoms, such as a copolymer rubber of at least two α-olefins and a non-conjugated diene. Specifically, an ethylene/α-olefin copolymer rubber, an ethylene/α-olefin/non-conjugated diene copolymer rubber, or a 1-butene/α-olefin copolymer rubber, may, for example, be mentioned. Particularly preferred is a random copolymer of ethylene with a $C_{3-20}$ α-olefin, having an ethylene content of from 50 to 90 wt %. As the α-olefin, propylene, 1-butene, 4-methyl-1-pentene, 1-pentene, 1-hexene or 1-octene may, for example, be mentioned. As the non-conjugated diene, one having from 6 to 20 carbon atoms, such as, dicyclopentadiene, 1,4-hexadiene, cyclooctadiene, methylene norbornene or ethylidene norbornene, may, for example, be preferably employed.

The olefinic rubber can be used in the form of an oil-extended rubber having a mineral oil type softening agent preliminarily added. The mineral oil type softening agent is added in an amount of from 10 to 150 parts by weight per 100 parts by weight of the olefinic rubber. It is preferred to add it by a method wherein the mineral oil type softening agent is added to the reaction solution or the suspension for polymerization of the olefinic rubber and then the solvent for reaction is removed.

The hydrogenated styrene type rubber is constituted by a copolymer rubber obtained by hydrogenating a block polymer prepared from a polymer block of styrene or its derivative and a conjugated diene.

The derivative of styrene may, for example, be α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene or 4-(phenylbutyl)styrene. Styrene or α-styrene is preferred.

The conjugated diene may, for example, be butadiene, isoprene, pentadiene or 2,3-dimethylbutadiene. Among them, isoprene or a combination of isoprene and butadiene, is preferred. Some or all of carbon-carbon double bonds in the polymer units of this conjugated diene block are hydrogenated. The melt flow rate (MFR, conditions: 230° C., 2.16 kg load) of such a hydrogenated styrene rubber is usually within a range of from 0.01 to 100 g/10 minutes, preferably from 0.01 to 50 g/10 minutes.

To the thermoplastic elastomer composition of the present invention, a softening agent may be incorporated for the purpose of imparting flexibility and improving the moldability. As the softening agent, a softening agent which is commonly used for rubber, is suitable. Specifically, a petroleum type substance such as process oil, a lubricant, paraffin, liquid paraffin, polyethylene wax, polypropylene wax, petroleum asphalt or vaseline, a coal tar material such as coal tar or coal tar pitch, a fatty acid such as castor oil, linseed oil, rapeseed oil, soybean oil or coconut oil, a wax such as tall oil, bees wax, carnauba wax or lanolin, a phthalate plasticizer such as di-2-ethylhexyl phthalate, di-n-octyl phthalate, diisodecyl phthalate, dibutyl phthalate or dihexyl phthalate, a linear dibasic acid ester plasticizer such as dioctyl adipate or dioctyl sebacate, a trimellitate plasticizer, a polyester polymer plasticizer, or a phosphate plasticizer such as triphenyl phosphate, trixylyl phosphate or tricresyl phosphate, may, for example, be mentioned. They may be used alone or in combination as a mixture of two or more of them.

The amount of the softening agent is suitably determined depending upon the types and amounts of the above-mentioned various constituting components or additives or the hardness of the intended product. However, it is usually selected within a range of from 1 to 200 parts by weight, preferably from 3 to 150 parts by weight, per 100 parts by weight of the thermoplastic elastomer composition.

The thermoplastic elastomer composition to be used in the present invention, may be partially crosslinked. Crosslinking is carried out by adding a crosslinking agent such as an organic peroxide to a blend comprising the crystalline polyolefin resin and the rubber component, or to a blend having the chlorinated polyethylene further added thereto, and melting and kneading the blend.

Specifically, the organic peroxide may, for example, be dimethyl peroxide, di-t-butyl peroxide, 2,5-dimethyl-2,5-di-(t-butylperoxy)hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxy benzoate, t-butylperoxyisopropyl carbonate, diacetyl peroxide, lauroyl peroxide or t-butylcumyl peroxide. Among them, preferred is 2,5-dimethyl-2,5-di-(t-butylperoxy)hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane or n-butyl-4,4-bis(t-butylperoxy)valerate.

At the time of crosslinking treatment by means of such an organic peroxide, a peroxy crosslinking assistant such as sulfur, p-quinonedioxime, p,p'-dibenzoylquinonedioxime, N-methyl-N-4-dinitrosoaniline, nitrosobenzene, diphenylguanidine or trimethylolpropane-N,N'-m-phenylene dimaleimide, a polyfunctional methacrylate monomer such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate, or a polyfunctional vinyl monomer such as vinyl butyrate or vinyl acetate, may be incorporated. Among them, divinylbenzene is particularly preferred.

When the blend of the crystalline polyolefin resin and the rubber component is subjected to crosslinking treatment, the organic peroxide is used in an amount within a range of from 0.05 to 3 parts by weight, preferably from 0.1 to 1 part by weight, per 100 parts by weight of the blend, and the crosslinking assistant, the polyfunctional methacrylate or the polyfunctional vinyl monomer, is used within a range of from 0.01 to 2 parts by weight, preferably from 0.03 to 1 part by weight, per 100 parts by weight of the blend.

When the blend having the chlorinated polyethylene further added to the above blend, is subjected to crosslinking treatment, the organic peroxide is used in an amount within a range of from 0.01 to 3 parts by weight, preferably from 0.05 to 2 parts by weight, per 100 parts by weight of the blend, and the crosslinking assistant, the polyfunctional methacrylate or the polyfunctional vinyl monomer, is used in an amount within a range of from 0.01 to 5 parts by weight, preferably from 0.03 to 3 parts by weight, per 100 parts by weight of the blend.

To the thermoplastic elastomer composition of the present invention, a stabilizer such as a hydrotalcite, an epoxy compound or a phosphite compound may be incorporated, as the case requires, to obtain an excellent stabilizing effect.

The hydrotalcite is a double salt of magnesium and aluminum, and one obtained by pulverizing a natural ore such as manasseite, or one prepared by synthesis, may be employed, and it is represented by the following formula (1):

$$Mg_{x1}Zn_{x2}Al_2 \cdot (OH)_{2x1+2x2+4} \cdot (CO_3) \cdot mH_2O \quad (1)$$

wherein x1 and x2 are numbers satisfying $0 \leq x2/x1 < 10$, $2 \leq x1+x2 < 20$, and m is 0 or a positive number.

The hydrotalcite may be one surface-treated with a metal salt of a higher fatty acid such as sodium stearate or sodium oleate, wax, titanium or a silane coupling agent.

The hydrotalcite is used in an amount within a range of from 0.1 to 20 parts by weight per 100 parts by weight of the thermoplastic elastomer composition.

The epoxy compound is a compound having an epoxy group (an oxirane ring) in its molecule, and it may, for example, be an epoxidized vegetable oil, an epoxidized animal oil, an epoxidized fatty acid ester, an epoxidized alicyclic compound, a bisphenol A glycidyl ether or an epoxidized polybutadiene, preferably an epoxidized vegetable oil such as epoxidized soybean oil, epoxidized linseed oil, epoxidized sunflower oil or epoxidized corn oil, particularly preferably epoxidized soybean oil or epoxidized linseed oil.

The epoxy compound is used in an amount of from 0.1 to 5 parts by weight, per 100 parts by weight of the thermoplastic elastomer composition. If its amount is less than 0.1 part by weight, no adequate effect as a stabilizer will be obtained, and if it is too much, bleeding is likely to result.

The phosphite compound may, for example, be a trialkyl ($C_1$–$C_{20}$) phosphite, a triaryl ($C_6$–$C_{14}$) phosphite, an alkyl ($C_1$–$C_{20}$)aryl($C_6$–$C_{14}$) phosphite or an oligophosphite which is a compound wherein two substituents form a ring or a compound having an oligomer structure wherein substituents are intramolecularly bonded. It may, for example, be a triaryl phosphite such as triphenyl phosphite, trisnonylphenyl phosphite, tris(o-cyclohexylphenyl)phosphite, tris(p-nonylphenyl)phosphite, tri(mononyl/dinonylphenyl) phosphite, phenyl-p-nonylphenyl phosphite or tris(2,4-di-t-butylphenyl)phosphite, an alkylaryl phosphite such as isooctyldiphenyl phosphite, indecyldiphenyl phosphite, lauryldiphenyl phosphite, phenyldiisodecyl phosphite or phenyldilauryl phosphite, a trialkyl phosphite such as triisooctyl phosphite, triisodecyl phosphite, trilauryl phosphite or trioleyl phosphite, or an oligophosphite such as bisphenol A tetra $C_{12-15}$ alkyl diphosphite, distearylpentaerythritol diphosphite, 2-t-butyl-α(3-t-butyl-4-hydroxyphenyl)p-cumenylbis(p-nonylphenyl)phosphite, diisodecylpentaerythritol diphosphite or dinonylphenyl dipentaerythritol diphosphite. These phosphite compounds may be used alone or in combination as a mixture of two or more of them.

The amount of the phosphite is usually from 0.01 to 5 parts by weight, preferably from 0.1 to 3 parts by weight, per 100 parts by weight of the thermoplastic elastomer composition.

To the thermoplastic elastomer composition of the present invention, various additives may further be incorporated such as other stabilizers, lubricants, oxidizing agents, ultraviolet absorbers, blowing agents, flame retardants, coloring agents or fillers.

The method for producing a thermoplastic elastomer composition of the present invention may, for example, be a method of producing it by heating and kneading a blend comprising the chlorinated polyethylene, the crystalline polyolefin and the rubber component, and, if necessary, a softening agent, a crosslinking agent, a crosslinking assistant or various additives, a method of producing it by firstly heating and kneading a blend comprising the crystalline polyolefin and the rubber component, and if necessary, a softening agent, a crosslinking agent, a crosslinking assistant or various additives and subsequently, adding the chlorinated polyethylene and if necessary, a softening agent or various additives, followed by uniform heating and kneading, or a method of producing it by firstly heating and kneading the chlorinated polyethylene and, if necessary, a softening agent or various additives, and then adding the crystalline polyolefin, the rubber component and, if necessary, a crosslinking agent and a crosslinking assistant, thereto, followed by uniform heating and kneading.

In such a case, the kneading temperature is usually within a range of from 150 to 220° C., preferably from 170 to 210° C., in the case of a mixture containing the chlorinated polyethylene, and if the temperature is higher than this range, the chlorinated polyethylene is likely to be decomposed. In the case of a mixture containing no chlorinated polyethylene, the kneading temperature is usually from 150 to 280° C., preferably from 170 to 240° C. The kneading time is usually from 1 to 20 minutes, preferably from 1 to 10 minutes.

It is particularly preferred that firstly the chlorinated polyethylene and, if necessary, a softening agent and various additives, are heated and kneaded, and then, the crystalline polyolefin and the olefinic rubber or the hydrogenated styrene, and/or, if necessary, a crosslinking agent and a crosslinking assistant, are added thereto, whereby a material excellent in the extruded appearance can be obtained. The morphology of the obtained material will be such that in the crystalline polyolefin as the matrix, two components of the chlorinated polyethylene and the rubber are present as domains of a few μm, respectively independently. By firstly kneading the chlorinated polyethylene, there will be no chlorinated polyethylene present in a non-molten state, whereby a material excellent in the appearance can be obtained.

The thermoplastic elastomer composition of the present invention can be produced by means of a mixing roll, an extruder type processor such as a single screw extruder, a twin screw extruder, a co-kneader or a batch type pressure kneader, or a Banbury mixer.

The thermoplastic elastomer composition of the present invention may be formed into various formed products including, for example, interior or exterior materials for vehicles such as automobiles, interior or exterior materials for buildings, gaskets (including packings, sealing agents and sealing materials) for vehicles such as automobiles, electric appliances and buildings, by means of a molding or forming machine such as an injection molding machine, a single screw extruder, a twin screw extruder, a compression molding machine or a calender processing machine. Especially, the effects of the present invention will adequately be obtained with profile extruded products.

Now, the present invention will be described in further detail with reference to Examples. However, it should be understood that the present invention is by no means restricted to such specific Examples.

EXAMPLES 1 to 10

AND

COMPARATIVE EXAMPLES 1 to 5

Preparation of Thermoplastic Elastomers

In each of Examples 1 to 10, in addition to the components, of which the amounts are indicated in Table 1, 5 parts by weight of a hydrotalcite, 3 parts by weight of an epoxy compound, 1 part by weight of a phosphite compound and 1 part by weight of stearic acid were put into a Banbury mixer and kneaded under such conditions that the jacket temperature was 150° C. and the rotational speed was 80 rpm, until the resin temperature became 190° C., to obtain a uniform kneaded product. This kneaded product was transferred to a mill roll, sheeted and pelletized by a sheet cut method to obtain a thermoplastic elastomer composition.

In each of Comparative Examples 1 and 2, the components, of which the amounts are indicated in Table 1, were extruded at 220° C. by means of a twin screw extruder BT-30 (L/D=30, rotated in the same direction) manufactured by Plastic Engineering Research Center, to obtain a thermoplastic elastomer composition.

In each of Comparative Examples 3 to 5, in addition to the components, of which the amounts are indicated in Table 1, 5 parts by weight of a hydrotalcite, 3 parts by weight of an epoxy compound, 1 part by weight of a phosphite compound and 1 part by weight of stearic acid, were put into a Banbury mixer and kneaded under such conditions that the jacket temperature was 150° C. and the rotational speed was 80 rpm, until the resin temperature became 180° C., to obtain a uniform kneaded product. This kneaded product was transferred to a mill roll, sheeted and pelletized by a sheet cut method, to obtain a thermoplastic elastomer composition.

Each obtained thermoplastic elastomer composition was compression-molded at a temperature of 180° C. to prepare a predetermined test specimen. For the extrudability test, pellets were used as they were.

Starting Materials Used

Chlorinated Polyethylene

CPE-1: Chlorine content: 30 wt %, heat of crystal fusion: 7 cal/g, molecular weight of polyethylene before chlorination: 350,000

Crystalline Polypropylene Resin

PP-1: Propylene/ethylene random copolymer, ethylene content: 3.2 wt %, MFR: 5 g/10 min Olefin Rubber EP-1: Ethylene/propylene/ethylidenenorbornene copolymer rubber, Mooney viscosity [$ML_{1+4}(100°$ C.)]: 88, ethylene content: 66 wt %, diene content: 4.5 wt %

EP-2: Oil-extended rubber having 75 parts by weight of process oil blended to 100 parts by weight of ethylene/propylene/ethylidenenorbornene copolymer rubber, Mooney viscosity [$ML_{1+4}(100°$ C.)]: 60, Mooney viscosity [$ML_{1+4}(100°$ C.)]: 250 (before extended by oil), ethylene content: 66 wt %, diene content: 4.5 wt %

EP-3: Ethylene/propylene copolymer rubber, Mooney viscosity [$ML_{1+4}(100°$ C.)]: 19, ethylene content: 75 wt %

Styrene Type Rubber

SE-1: Hydrogenated product of styrene/butadiene/styrene block copolymer, MFR: 3 g/10 min.

SE-2: Styrene/butadiene/styrene block copolymer, MFR: 6 g/10 min.

Acrylonitrile/butadiene Type Rubber

NBR: Acrylonitrile/butadiene rubber, acrylonitrile content: 40%, THF solubility: 5 wt %

Softening Agent

Softening agent 1: DOP (di-2-ethylhexyl phthalate), manufactured by Mitsubishi Chemical Corporation Softening agent 2: Mineral oil type process oil, PW-380, tradename, manufactured by Idemitsu Kosan K.K.

Crosslinking Agent

POX: 2,5-Dimethyl-2,5-di(t-butylperoxy)hexane

DVB: Divinyl benzene

Hydrotalcite: DHT-4C, tradename, manufactured by Kyowa Kagaku K.K.

Epoxy compound: Epoxidized soybean oil, Adecacizer O-130P, tradename, manufactured by Asahi Denka Kogyo K.K.

Phosphite compound: Bisphenol A tetra $C_{12-15}$ alkyl diphosphite, MARK1500, tradename, manufactured by Asahi Denka Kogyo K.K.

Evaluation of the physical properties was carried out by the following methods.

Test Methods

Oil resistance: In accordance with JIS K6301. The volume change after immersion in JIS No. 1 oil at 100° C. for 70 hours, was measured.

Bonding property: To a sheet having a thickness of 2 mm and a size of 100 mm×200 mm, a pressure sensitive adhesive double coated tape having a width of 10 mm (No. 501F, tradename, manufactured by Nitto Denko K.K.) was bonded along the length of 200 mm and fixed to a stainless steel plate, whereupon the assembly was disposed in a constant temperature humidity chamber so that the sheet faced down and left to stand for 168 hours under such conditions that the temperature was 60° C. and the humidity was 95%, whereupon the bonding state between the double coated tape and the sheet was observed.

○: The sheet was firmly fixed to the stainless steel plate.

Δ: The sheet was fixed to the stainless steel plate, but was peeled easily.

X: The sheet was peeled off from the stainless steel plate.

Extrudability: An extrusion molding product was prepared by means of a fullflight screw extruder equipped with an extruder die having a cross-sectional shape of the extruded product shown in FIG. 1, with 40 mmφ and L/D=22, under a condition of a die temperature of 180° C., whereby the cross-sectional shape of the extruded product against the shape of the die was observed.

○: The same shape.

Δ: The cross-sectional shape close to the shape of the die.

X: Deformed.

Weather resistance: Using a sunshine weather-ometer (WEL-SUN-DC-B Model, manufactured by Suga Shikenki K.K.), the color change and the appearance change were observed after 500 hours under such conditions that the black panel temperature was 63° C., and it rained for 12 minutes for each cycle of 60 minutes.

Evaluation

○: No change in the appearance observed.

Δ: A slight change in the appearance observed.

X: A distinct change in the appearance observed.

TABLE 1

| | Chlorinated polyethylene Parts by weight | Crystalline polyolefin resin Parts by weight | Rubber type | Rubber Parts by weight | Softening agent-1 Parts by weight | Softening agent-2 Parts by weight | POX Parts by weight | DVB Parts by weight | Extrudability | Oil resistance (%) | Bonding property | Weather resistance |
|---|---|---|---|---|---|---|---|---|---|---|---|---|
| Ex. 1 | 100 | 360 | EP-1 | 540 | 40 | 0 | 0 | 0 | ○ | 40 | ○ | ○ |
| Ex. 2 | 100 | 160 | EP-1 | 240 | 40 | 0 | 0 | 0 | ○ | 30 | ○ | ○ |
| Ex. 3 | 100 | 60 | EP-1 | 90 | 40 | 0 | 0 | 0 | ○ | 25 | ○ | ○ |
| Ex. 4 | 100 | 30 | EP-1 | 30 | 40 | 0 | 0 | 0 | ○ | 10 | ○ | ○ |
| Ex. 5 | 100 | 45 | EP-1 | 40 | 100 | 30 | 0.2 | 0.3 | ○ | 5 | ○ | ○ |
| Ex. 6 | 100 | 60 | EP-1 | 340 | 50 | 35 | 0.2 | 0.3 | ○ | 35 | ○ | ○ |
| Ex. 7 | 100 | 100 | EP-1 | 300 | 50 | 30 | 0.2 | 0.3 | ○ | 30 | ○ | ○ |
| Ex. 8 | 100 | 160 | EP-1 | 280 | 50 | 100 | 0.2 | 0.3 | ○ | 25 | ○ | ○ |
| Ex. 9 | 100 | 100 | EP-2 | 300 | 50 | 0 | 0.2 | 0.3 | ○ | 20 | ○ | ○ |
| Ex. 10 | 100 | 30 | SE-1 | 30 | 50 | 30 | 0 | 0 | ○ | 10 | ○ | ○ |
| Comp. Ex. 1 | 0 | 30 | EP-1 | 70 | 0 | 35 | 0.2 | 0.3 | X | 120 | X | ○ |
| Comp. Ex. 2 | 0 | 30 | SE-1 | 70 | 0 | 40 | 0 | 0 | X | 150 | Δ | ○ |
| Comp. Ex. 3 | 100 | 100 | EP-3 | 300 | 50 | 30 | 0.2 | 0.3 | Δ | 60 | ○ | ○ |
| Comp. Ex. 4 | 100 | 30 | SE-2 | 100 | 0 | 40 | 0 | 0 | ○ | 70 | ○ | X |
| Comp. Ex. 5 | 100 | 30 | NBR | 100 | 60 | 0 | 0 | 0 | ○ | 5 | ○ | X |

The thermoplastic elastomer composition of the present invention comprises, as the essential components, the chlorinated polyethylene, the crystalline polyolefin resin and a rubber component selected from a hydrogenated styrene type rubber and an olefinic rubber having a Mooney viscosity [$ML_{1+4}(100°\ C.)$] within a range of from 50 to 350, whereby the profile extrudability, oil resistance, bonding property and weather resistance are improved, and the compatibility with an olefinic material is excellent.

Accordingly, the thermoplastic elastomer composition of the present invention is useful for packing materials for automobiles, for exterior parts such as a door mall, an opening trim, a glass channel or a weather strip, interior parts such as a door surface and a grip, for electric parts, for building materials, and for industrial gaskets. Its effects are obtainable for a long period of time, and it can be recycled together with the olefinic material.

What is claimed is:

1. A thermoplastic elastomer composition comprising 100 parts by weight of a chlorinated polyethylene, from 5 to 1,000 parts by weight of a crystalline polyolefin resin and from 20 to 1,500 parts by weight of a rubber component, wherein the rubber component is an olefinic rubber which has a Mooney viscosity ($ML_{1+4}(100°\ C.)$) within a range of from 50 to 350.

2. The thermoplastic elastomer composition according to claim 1, which contains from 1 to 200 parts by weight of a softening agent per 100 parts by weight of the thermoplastic elastomer composition.

3. The thermoplastic elastomer composition according to claim 1, wherein the chlorinated polyethylene is one obtained by post-chlorinating a polyethylene having a weight average molecular weight of from 100,000 to 750,000 and has a chlorine content of from 20 to 45 wt % and a heat of crystal fusion of from 5 to 35 cal/g as measured by a DSC method.

4. The thermoplastic elastomer composition according to claim 1, wherein the crystalline polyolefin resin and the rubber component are contained in a weight ratio of 10 to 70:30 to 90.

5. The thermoplastic elastomer composition according to claim 1, wherein the crystalline polyolefin resin is a crystalline polypropylene resin.

6. The thermoplastic elastomer composition according to claim 1, wherein the olefinic rubber is an α-olefin random copolymer rubber made of a random copolymer of ethylene with a $C_{3-20}$ α-olefin, having an ethylene content of from 50 to 90 wt %.

7. A thermoplastic elastomer composition comprising 100 parts by weight of a chlorinated polyethylene, from 5 to 1,000 parts by weight of a crystalline polyolefin resin and from 20 to 1,500 parts by weight of a rubber component, wherein the rubber component is a hydrogenated styrene rubber.

8. The thermoplastic elastomer composition according to claim 7, which contains from 1 to 200 parts by weight of a softening agent per 100 parts by weight of the thermoplastic elastomer composition.

9. The thermoplastic elastomer composition according to claim 7, wherein the chlorinated polyethylene is one obtained by post-chlorinating a polyethylene having a weight average molecular weight of from 100,000 to 750,000 and has a chlorine content of from 20 to 45 wt % and a heat of crystal fusion of from 5 to 35 cal/g as measured by a DSC method.

10. The thermoplastic elastomer composition according to claim 7, wherein the crystalline polyolefin resin and the rubber component are contained in a weight ratio of 10 to 70:30 to 90.

11. The thermoplastic elastomer composition according to claim 7, wherein the crystalline polyolefin resin is a crystalline polypropylene resin.

12. The thermoplastic elastomer composition according to claim 7, wherein the hydrogenated styrene rubber is one obtained by hydrogenating a block polymer prepared from styrene or its derivative selected from the group consisting of α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and a conjugated diene.

* * * * *